(12) United States Patent
Lee et al.

(10) Patent No.: US 8,958,289 B2
(45) Date of Patent: Feb. 17, 2015

(54) METHOD OF TRANSCEIVING SIGNAL IN WIRELESS COMMUNICATION SYSTEM AND APPARATUS THEREOF

(75) Inventors: Jae Wook Lee, Anyang-si (KR); Sung Jun Park, Anyang-si (KR); Sung Hoon Jung, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 13/521,705

(22) PCT Filed: Mar. 24, 2011

(86) PCT No.: PCT/KR2011/002041
§ 371 (c)(1),
(2), (4) Date: Jul. 11, 2012

(87) PCT Pub. No.: WO2011/118997
PCT Pub. Date: Sep. 29, 2011

(65) Prior Publication Data
US 2013/0044590 A1 Feb. 21, 2013

Related U.S. Application Data

(60) Provisional application No. 61/317,711, filed on Mar. 26, 2010, provisional application No. 61/318,368, filed on Mar. 28, 2010.

(30) Foreign Application Priority Data

Mar. 17, 2011 (KR) ........................ 10-2011-0023755

(51) Int. Cl.
*H04W 76/06* (2009.01)

(52) U.S. Cl.
CPC .................................. *H04W 76/068* (2013.01)
USPC .......................................................... 370/228

(58) Field of Classification Search
CPC .................................................... H04W 76/068
See application file for complete search history.

(56) References Cited

U.S. PATENT DOCUMENTS

2003/0210653 A1* 11/2003 Pan ................................ 370/235
2005/0047374 A1*  3/2005 Rajkotia et al. ............... 370/332
(Continued)

OTHER PUBLICATIONS

Huawei, "DL Radio Link Failure in CA", R2-101017, 3GPP TSG RAN WG2 Meeting #69, Feb. 2010.
Samsung, "Handling of dedicated RLF timers", R2-101192, 3GPP TSG RAN WG2 Meeting #69, Feb. 2010.
(Continued)

*Primary Examiner* — Huy D Vu
*Assistant Examiner* — Bao G Nguyen
(74) *Attorney, Agent, or Firm* — Lee, Hong, Degerman, Kang & Waimey

(57) ABSTRACT

A method of processing a signal at a network node of a wireless communication system is disclosed. The method comprises detecting a problem of a first interface; and transmitting a first message to the user equipment via a second interface for suspending data transmission through the second interface. Also, the method further comprises transmitting a second message to the user equipment via the second interface for resuming data transmission through the second interface, if a recovery of the problem of the first interface is completed. Preferably, the method further comprises transmitting a third message to the user equipment via the second interface for releasing connection between the network node and the user equipment, if a recovery of the problem of the first interface is failed.

5 Claims, 10 Drawing Sheets

(56) References Cited

U.S. PATENT DOCUMENTS

2006/0013126 A1 * 1/2006 Yasuoka et al. .............. 370/217
2009/0257353 A1 10/2009 Song et al.

OTHER PUBLICATIONS

LG Electronics Inc., "DL RLF for CA", R2-101484, 3GPP TSG RAN WG2 Meeting #69, Feb. 2010.

* cited by examiner (a) contol - plane protocol stack (b) user - plane protocol stack

METHOD OF TRANSCEIVING SIGNAL IN WIRELESS COMMUNICATION SYSTEM AND APPARATUS THEREOF

CROSS-REFERENCE TO RELATED APPLICATIONS

This application is the National Stage filing under 35 U.S.C. 371 of International Application No. PCT/KR2011/002041, filed on Mar. 24, 2011, which claims the benefit of earlier filing date and right of priority to Korean Application No. 10-2011-0023755, filed on Mar. 17, 2011, and also claims the benefit of U.S. Provisional Application Ser. No. 61/317,711, filed on Mar. 26, 2010, and U.S. Provisional Application Ser. No. 61/318,368, filed on Mar. 28, 2010, the contents of which are all incorporated by reference herein in their entirety.

TECHNICAL FIELD

The present invention relates to a wireless communication system, and more particularly, to a method of transceiving a signal among a user equipment, a base station and a relay node in a wireless communication system and an apparatus thereof.

BACKGROUND ART

A 3rd generation partnership project long term evolution (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify time and frequency domains to which data will be transmitted and information related to encoding, data size, hybrid automatic repeat and request (HARQ). Also, the base station transmits uplink (UL) scheduling information of uplink data to the corresponding user equipment to notify time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

DISCLOSURE OF INVENTION

Technical Problem

Accordingly, the present invention is directed to a method of transceiving a signal in a wireless communication system and an apparatus thereof, which substantially obviate one or more problems due to limitations and disadvantages of the related art.

An object of the present invention is to provide a method of transceiving a signal among a user equipment, a base station and a relay node in a wireless communication system and an apparatus thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method of processing a signal at a user equipment of a wireless communication system comprises receiving a first message from a network node; starting a timer after receiving the first message; and releasing a connection with the network node after the timer expires. In this case, the first message includes information on the timer. Preferably, the information on the timer is a timer value. Also, the network node is a relay node.

The method further comprises suspending communication with the network node after receiving the first message. In this case, the method further comprises receiving a second message from the network node after receiving the first message; and resuming communication with the network node if the timer does not expire. Also, the method further comprises receiving a third message from the network node after receiving the first message; and releasing connection with the network node and initializing the timer if the timer does not expire.

In another aspect of the present invention, a user equipment of a wireless communication system comprises a receiving module for receiving a first message from a network node; and a processor for starting a timer after receiving the first message, and for releasing connection with the network node if the timer expires. In this case, the first message includes information on the timer. Preferably, the information on the timer is a timer value. Also, the network node is a relay node.

In still another aspect of the present invention, a method of processing a signal at a network node of a wireless communication system comprises detecting a problem of a first interface; and transmitting a first message to the user equipment via a second interface for suspending data transmission through the second interface. In this case, the problem of the first interface is radio link failure (RLF) of the first interface, and the network node is a relay node. Also, the first interface is a communication link between the relay node and a base station, and the second interface is a communication link between the relay node and the user equipment.

Preferably, the method further comprises transmitting a second message to the user equipment via the second interface for resuming data transmission through the second interface, if a recovery of the problem of the first interface is completed. More preferably, the method further comprises transmitting a third message to the user equipment via the second interface for releasing connection between the network node and the user equipment, if a recovery of the problem of the first interface is failed.

In further still another aspect of the present invention, a relay node of a wireless communication system comprises a processor for detecting a problem of a first interface; and a transmitting module for transmitting a first message to the user equipment via a second interface for suspending data transmission through the second interface. In this case, the problem of the first interface is radio link failure (RLF) of the first interface, and the network node is a relay node. Also, the first interface is a communication link between the relay node and a base station, and the second interface is a communication link between the relay node and the user equipment.

Advantageous Effects of Invention

According to the embodiments of the present invention, the base station, the relay node and the user equipment can effectively transceive a signal.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary and can be applied to all communication systems corresponding to the aforementioned definition. Also, although the embodiment of the present invention will herein be described based on FDD mode, the FDD mode is only exemplary and the embodiment of the present invention can easily be applied to H-FDD mode or TDD mode.

Figure 1:
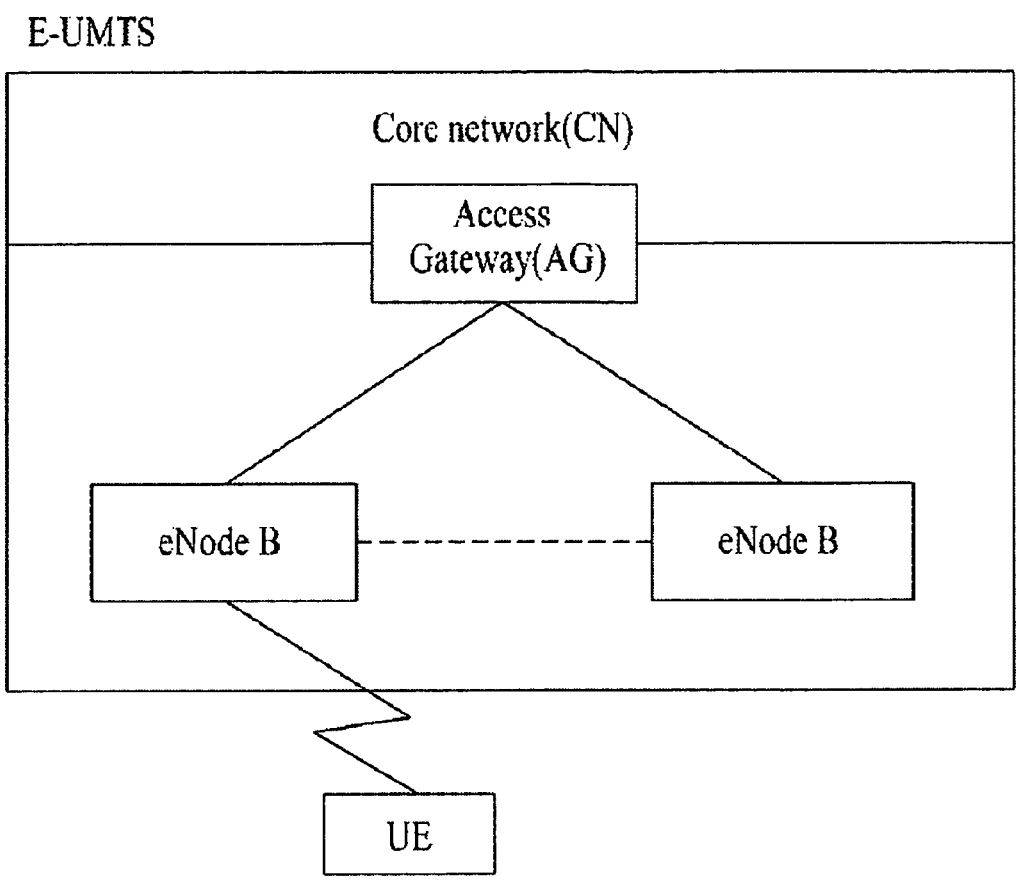
FIG. 1 is a diagram illustrating a network structure of an Evolved Universal Mobile Telecommunications System (E-UMTS) which is an example of a mobile communication system.
Figure 2:
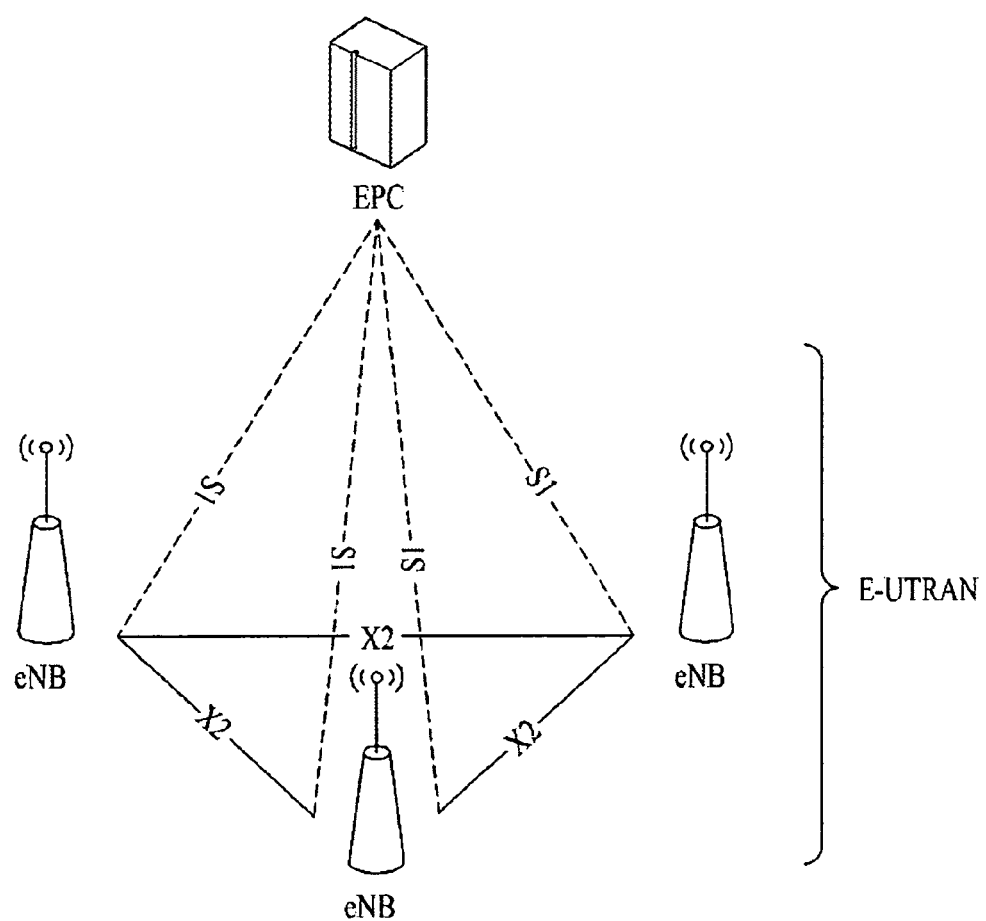
FIG. 2 is a diagram conceptionally illustrating a network structure of an Evolved Universal Terrestrial Radio Access Network (E-UTRAN)

FIG. 2 is a diagram conceptionally illustrating a network structure of an Evolved Universal Terrestrial Radio Access Network (E-UTRAN). In particular, the E-UTRAN system is a system evolving from the conventional UTRAN system and. The E-UTRAN includes cells (eNB) connected with one another through X2 interface. Each of eNBs is connected with a user equipment through a radio interface and connected with an Evolved Packet Core (EPC) through S1 interface.

The EPC includes a mobility management entity (MME), a serving-gateway (S-GW), and a packet data network-gateway (PDN-GW). The MME includes access information of the user equipment or ability information of the user equipment, wherein the access information or the ability information is mainly used for mobility management of the user equipment. The S-GW is a gateway having the E-UTRAN as an end point, and the PDN-GW is a gateway having a PDN as an end point.

Figure 3:
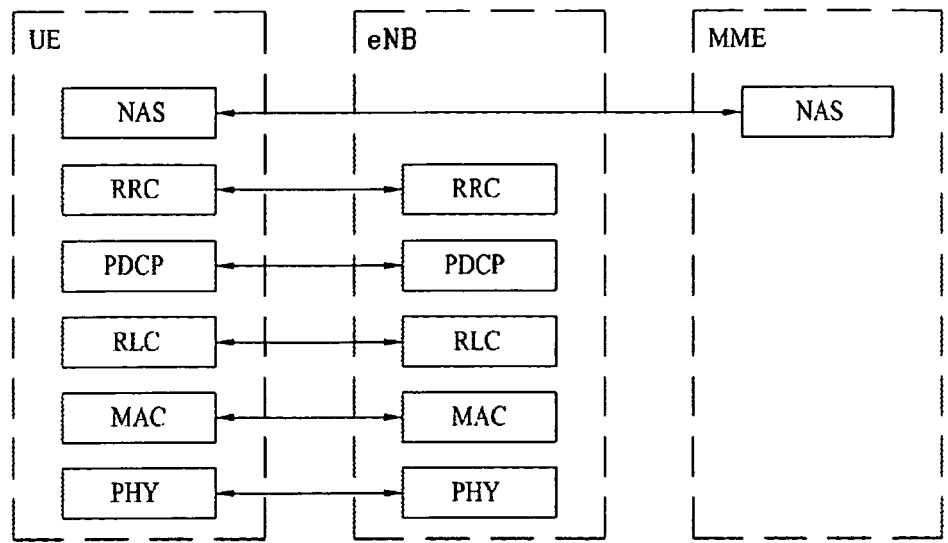
FIG. 3 is a diagram illustrating structures of a control plane and a user plane of a radio interface protocol between a user equipment and E-UTRAN based on the 3GPP radio access network standard.
Figure 3:
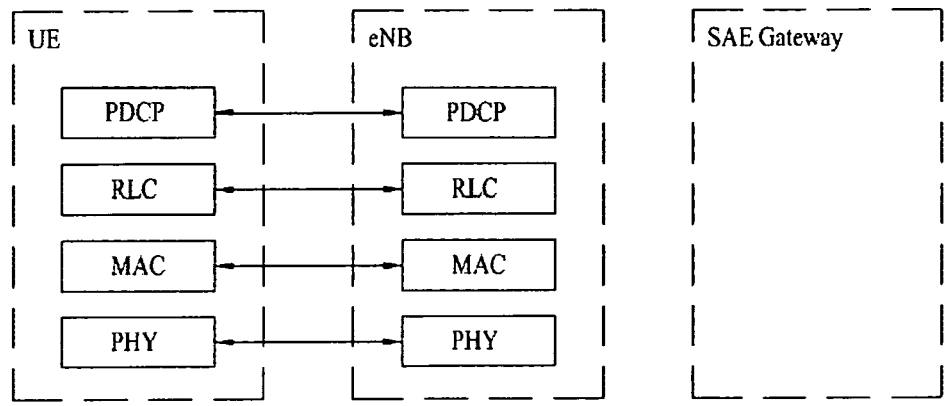

FIG. 3 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via logical channels. The RLC layer of the second layer supports reliable data transfer. The RLC layer may be implemented as a functional block inside the MAC layer. In order to effectively transmit data using IP packets (e.g., IPv4 or IPv6) within a radio interface having a narrow bandwidth, a packet data convergence protocol (PDCP) layer of the second layer performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other.

One cell constituting a base station (eNB) is established at one of bandwidths of 1.25, 2.5, 5, 10, 15, and 20 Mhz and provides a downlink or uplink transmission service to several user equipments. At this time, different cells can be established to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH).

Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 4:
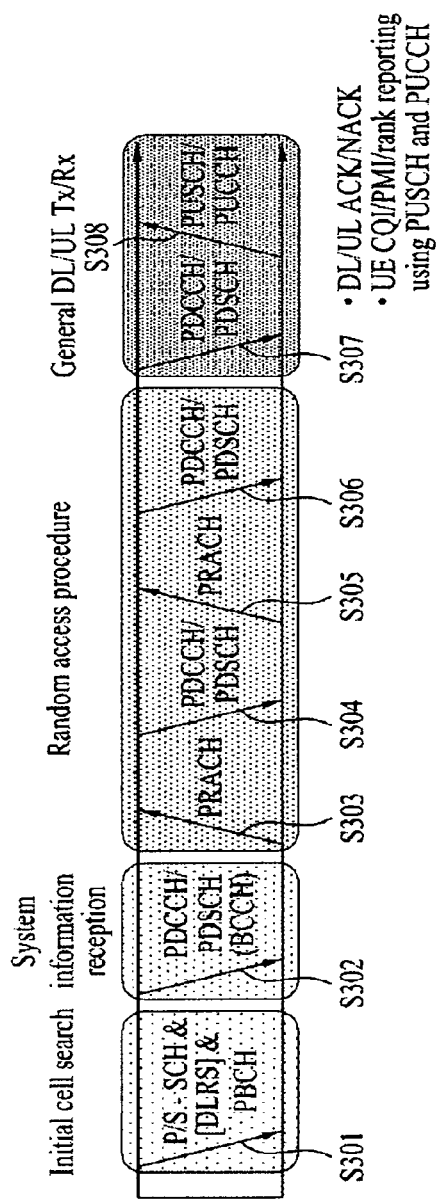
FIG. 4 is a diagram illustrating physical channels used in a 3GPP system and a general method for transmitting a signal using the physical channel.

FIG. 4 is a diagram illustrating physical channels used in a 3GPP system and a general method for transmitting a signal using the physical channel.

The user equipment performs initial cell search such as synchronizing with the base station when it newly enters a cell or the power is turned on (S401). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. Meanwhile, the user equipment can identify the status of a downlink channel by receiving a downlink reference signal (DL RS) in the initial cell search step.

The user equipment which has finished the initial cell search can acquire more detailed system information by receiving a physical downlink control channel (PDSCH) in accordance with a physical downlink control channel (PDCCH) and information carried in the PDCCH (S402).

Meanwhile, if the user equipment initially accesses the base station, or if there is no radio resource for signal transmission, the user equipment performs a random access procedure (RACH) for the base station (S403 to S406). To this end, the user equipment transmits a preamble of a specific sequence through a random physical random access channel (PRACH) (S403 and S405), and receives a response message to the preamble through the PDCCH and a PDSCH corresponding to the PDCCH (S404 and S406). In case of a contention based RACH, a contention resolution procedure can be performed additionally.

The user equipment which has performed the aforementioned steps receives the PDCCH/PDSCH (S407) and transmits a physical uplink shared channel (PUSCH) and a physical uplink control channel (PUCCH) (S408), as a general procedure of transmitting uplink/downlink signals. In particular, the user equipment receives downlink control information (DCI) through the PDCCH. The DCI includes control information such as resource allocation information on the user equipment and has different formats depending on its purpose of use.

The control information transmitted from the user equipment to the base station or received from the base station to the user equipment through the uplink includes downlink/uplink ACK/NACK, a channel quality indicator (CQI), a precoding matrix index (PMI), and a rank indicator (RI). In case of the 3GPP LTE system, the user equipment transmits the aforementioned control information of CQI/PMI/RI through the PUSCH and/or the PUCCH.

Figure 5:
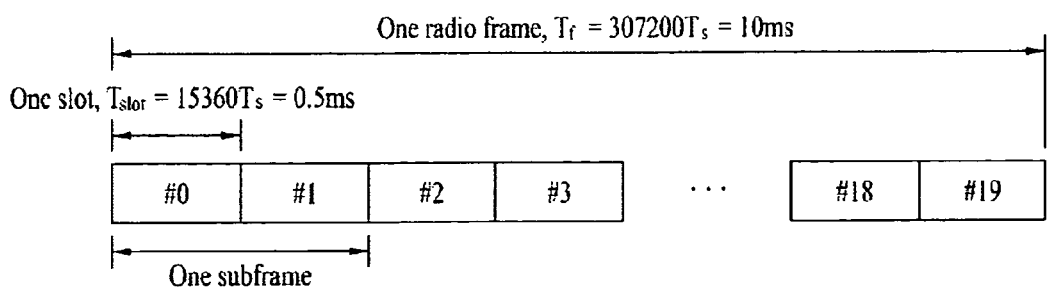
FIG. 5 is a diagram illustrating a structure of a radio frame used in an LTE system.

FIG. 5 is a diagram illustrating a structure of a radio frame used in the LTE system.

Referring to FIG. 5, the radio frame has a length of 10 ms($327200 \times T_s$) and includes 10 subframes of an equal size. Each sub frame has a length of 1 ms and includes two slots. Each slot has a length of 0.5 ms($15360 \times T_s$). In this case, $T_s$ represents a sampling time, and is expressed by $T_s=1/(15 kHz \times 2048)=3.2552 \times 10-8$ (about 33 ns). The slot includes a plurality of OFDM symbols in a time region, and includes a plurality of resource blocks (RBs) in a frequency region. In the LTE system, one resource block includes twelve (12) subcarriers×seven (or six) OFDM symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

Hereinafter, the RRC state of the user equipment and the RRC connection method thereof will be described. The RRC state means whether the RRC layer of the user equipment is logically connected with the RRC layer of the E-UTRAN. If the RRC layer of the user equipment is logically connected with the RRC layer of the E-UTRAN, it means the RRC_CONNECTED state. If not so, it means the RRC_IDLE state.

Since the E-UTRAN can identify the presence of the user equipment of the RRC connected state in a cell unit, it can effectively control the user equipment. On the other hand, the E-UTRAN cannot identify the user equipment of the RRC_IDLE state in a cell unit. The user equipment of the RRC_IDLE state is managed by the CN in a tracking area (TA) unit which is a local unit greater than a cell unit. In other words, the user equipment of the RRC_IDLE state should shift to the RRC_CONNECTED state to receive services such as voice and data from the cell.

In particular, when the user initially turns on the power of the user equipment, the user equipment searches a proper cell and then stays at the RRC_IDLE state in the corresponding cell. When the user equipment staying in the RRC_IDLE state needs RRC connection, it is RRC connected with the RRC layer of the E-UTRAN through RRC connection establishment procedure and shifts to the RRC_CONNECTED state. When uplink data transmission is required due to call attempt of the user, etc., or to transmit a response message to a paging message received from the E-UTRAN, the user equipment of the RRC_IDLE state needs RRC connection.

Figure 6:
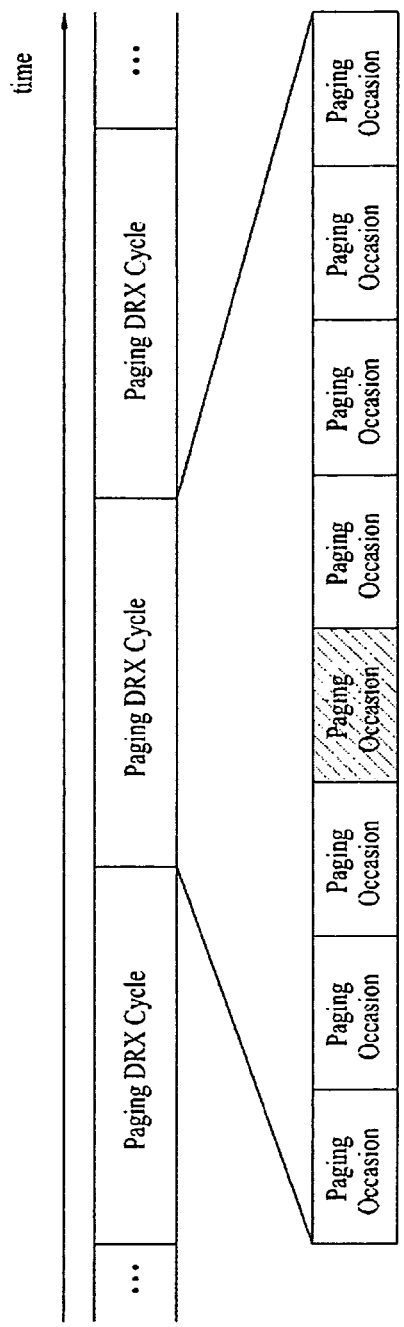
FIG. 6 is a diagram illustrating a general method of transceiving a signal using a paging message.

FIG. 6 is a diagram illustrating a general method of transceiving a signal using a paging message.

Referring to FIG. 6, a paging message includes a paging cause and a paging record, wherein the paging record includes user equipment (UE) identity. When receiving the paging message, the user equipment can perform discontinuous reception (DRX) to reduce power consumption.

In more detail, the network includes several paging occasions (PO) per time period called a paging DRX cycle, and a specific user equipment acquires the paging message by receiving a specific paging occasion only. The user equipment does not receive a paging channel for the time except for the specific paging occasion, and may be a sleep state to reduce power consumption. One paging occasion corresponds to one TTI.

The base station and the user equipment use a paging indicator (PI) as a specific value indicating transmission of the paging message. The base station can notify the user equipment of paging information transmission by defining a specific identifier (for example, paging ? radio network temporary identity (P-RNTI) as the PI. For example, the user equipment receives one subframe to identify the presence of the paging message by waking up per DRX period. If there is the P-RNTI in L1/L2 control channels (PDCCH) of the received subframe, the user equipment can identify that the paging message exists in the PDSCH of the corresponding subframe. Also, if there is the user equipment identity (for example, IMSI) in the paging message, the user equipment responds to the base station (for example, RRC connection or reception of system information) to receive a service from the base station.

Next, system information will be described. The system information includes essential information to be known by the user equipment to access the base station. Accordingly, the user equipment should receive all kinds of system information before accessing the base station, and should always have the latest system information. Since the system information is the information to be known by all user equipments within one cell, the base station transmits the system information periodically.

The system information can be classified into a master information block (MIB), a scheduling block (SB), and a system information block (SIB). The MIB allows the user equipment to know physical configuration, for example, bandwidth, of the corresponding cell. The SB indicates transport information of the SIBs, for example, transport period. The SIB is a set of associated system information. For example, a specific SIB includes only information of a periphery cell, and the other SIB includes only information of an uplink radio channel used by the user equipment.

Hereinafter, a cell selection procedure and a cell reselection procedure will be described.

If the power of the user equipment is turned on, the user equipment should perform preparation procedures of receiving a service by selecting a cell of proper quality. The user equipment of the RRC idle state should select a cell of proper quality and should be ready to receive a service through this cell. For example, the user equipment of which power has been just turned on should select a cell of proper quality for registration with the network. If the user equipment of the RRC connected state enters the idle state, it should select a cell staying in the RRC idle state. As described above, the procedure of selecting a cell, which satisfies a specific condition, to allow the user equipment to be stayed in a service standby state such as RRC idle state will be referred to as cell selection. Since cell selection is performed by the user equipment in a state that the user equipment fails to determine a cell staying in the RRC idle state, it is important to quickly select a cell if possible. Accordingly, if a cell, which provides radio signal quality more than a certain reference, the cell can be selected by the cell selection procedure of the user equipment even though the cell does not provide the best radio signal quality to the user equipment.

If the user equipment selects the cell that provides requirements for cell selection, it receives information required for action at the RRC idle state of the user equipment from the system information of the corresponding cell. After receiving all kinds of information required for action at the RRC idle state of the user equipment, the user equipment is on standby at the RRC idle state to request the network of a service or receive a service from the network.

After the user equipment selects a random cell through the cell selection procedure, signal intensity or quality between the user equipment and the base station may be changed due to mobility of the user equipment or change of the radio environment. Accordingly, if quality of the selected cell is deteriorated, the user equipment can select another cell that provides better quality. In this way, when the user equipment selects a cell again, it selects a cell that provides better signal quality than that of the current cell. This procedure will be referred to as cell reselection. In view of quality of a radio signal, the cell reselection procedure is basically performed to select a cell that provides the best quality to the user equipment. In addition to quality of a radio signal, the network can determine priority of cells per frequency to notify the user equipment of the priority. The user equipment that has received the priority first considers the priority prior to the radio signal quality.

Next, a random access (RA) procedure provided in the LTE system will be described. The random access procedure provided in the LTE system can be classified into a contention based random access procedure and a non-contention based random access procedure. The contention based random access procedure and the non-contention based random access procedure can be determined depending on whether the user equipment has directly selected a random access preamble used during the random access procedure or the base station has selected the random access preamble.

In the non-contention based random access procedure, the user equipment uses a specific random access preamble directly allocated from the base station. Accordingly, if the base station allocates the specific random access preamble to the user equipment only, the random access preamble is used by the user equipment only, and the other user equipments do not use the random access preamble. Accordingly, since the relation of 1:1 is made between the random access preamble and the user equipment that uses the random access preamble, no contention occurs. In this case, since the base station can identify the user equipment that has transmitted the random access preamble as soon as it receives the random access preamble, it is efficient.

By contrast, in the contention based random access procedure, since the user equipment selects a random one of random access preambles, which can be used by the user equipment, and transmits the selected random access preamble, the possibility that a plurality of user equipments use the same random access preamble always exists. Accordingly, even though the base station receives a specific random access preamble, it is impossible to identify what user equipment has transmitted the random access preamble.

The user equipment performs the random access procedure in case of the following cases: 1) if the user equipment performs initial access due to no RRC connection with the base station; 2) if the user equipment initially accesses a target cell during a handover procedure; 3) if the random access procedure is requested by a command of the base station; 4) uplink data occur in a state that time synchronization of the uplink is not performed or a designated radio resource is not allocated; and 5) if a recovery procedure is performed due to radio link failure or handover failure.

Figure 7:
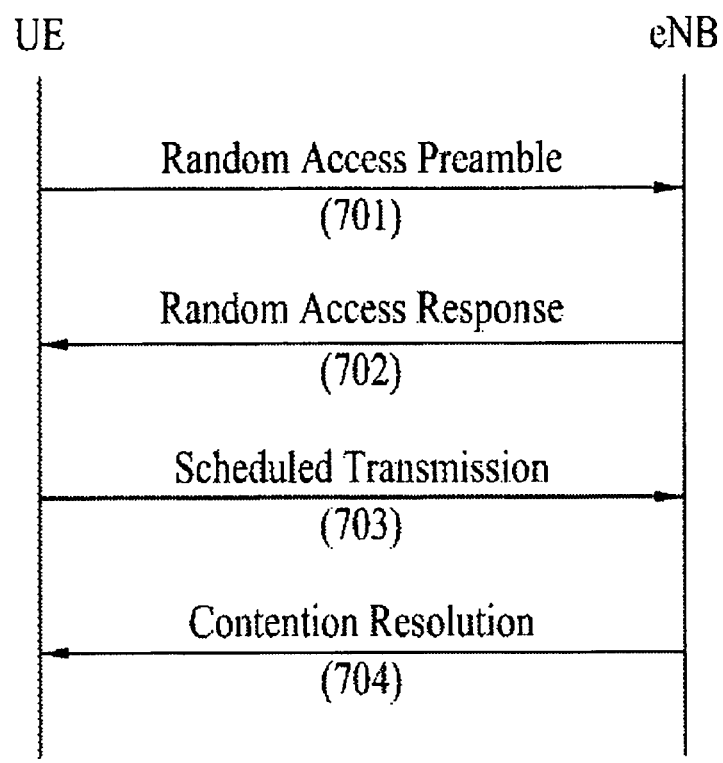
FIG. 7 is a diagram illustrating an operation procedure of a user equipment and a base station in a contention based random access procedure provided in an LTE system.

FIG. 7 is a diagram illustrating an operation procedure of a user equipment and a base station in a contention based random access procedure provided in an LTE system.

Referring to FIG. 7, in step 701, the user equipment randomly selects a random access preamble from a set of random access preambles indicated through system information or handover command, and selects a PRACH resource, which can transmit the random access preamble, and transmits the selected PRACH resource. At this time, the preamble is referred to as RACH MSG 1.

Also, after the user equipment transmits the random access preamble, in step 702, the base station attempts to receive its random access response within a random access response receiving window indicated through the system information or handover command. In more detail, RACH MSG 2, i.e., random access response information is transmitted in the form of MAC PDU, and the MAC PDU is transferred to the PDSCH. Also, in order that the user properly receives the information transferred to the PDSCH, the PDCCH is transferred together. In other words, the PDCCH includes information of the user equipment that should receive the PDSCH, frequency and time information of the radio resource of the PDSCH, and a transport format of the PDSCH. If the user equipment successfully receives the PDCCH, it properly receives the random access response transmitted to the PDSCH in accordance with the information of the PDCCH. The random access response includes random access preamble identity, uplink (UL) grant, temporary C-RNTI, and time alignment command. As random access response information for one or more user equipments can be included in one random access response, the random access preamble identity is required to indicate that the uplink grant, temporary C-RNTI and time alignment command are useful for what user equipment. The random access preamble identity is the same as the random access preamble selected by the user equipment in the step 701.

Subsequently, if the user equipment receives its useful random access response in step 703, it processes all kinds of information included in the random access response, respectively. In other words, the user equipment applies the time alignment command and stores the temporary C-RNTI. Also, the user equipment transmits data stored in a buffer or newly generated data to the base station by using the uplink grant. At this time, the data transmitted through the uplink grant, i.e., MAC PDU is referred to as RACH MSG 3. The data included in the uplink grant should essentially include the user equipment identity. This is because that it is required to identify the user equipments for contention resolution as the base station cannot determine what user equipments perform the random access procedure in the contention based random access procedure. Also, there are two methods of including the user equipment identity in the data included in the uplink grant. According to the first method, if the user equipment has a useful cell identity allocated from the corresponding cell before the random access procedure, it transmits its cell identity through the uplink grant. On the other hand, if the user equipment does not have a useful cell identity before the random access procedure, it transmits its cell identity together with its unique identity. Generally, the unique identity is longer than the cell identity. If the user equipment transmits data through the uplink grant, it initiates a contention resolution timer.

Finally, after the user equipment transmits data, which includes its identity, through the uplink grant included in the random access response, it waits for a command of the base station for contention resolution. In other words, the user equipment attempts to receive the PDCCH to receive a specific message. There are two methods of receiving the PDCCH. As described above, if the user equipment identity transmitted through the uplink grant is the cell identity, the user equipment attempts to receive the PDCCH by using the cell identity. If the user equipment identity is the unique identity, the user equipment attempts to receive the PDCCH by using the temporary C-RNTI. Afterwards, in case of the former case, if the user equipment receives the PDCCH (i.e., RACH MSG 4) through its cell identity before the contention resolution timer expires, the user equipment determines that the random access procedure has been performed normally and ends the random access procedure. In case of the latter case, if the user equipment receives the temporary C-RNTI before the contention resolution timer expires, it identifies data transferred from the PDSCH indicated by the PDCCH. If the unique identity of the user equipment is included in the data, the user equipment determines that the random access procedure has been performed normally and ends the random access procedure.

Meanwhile, if the channel status between the base station and the user equipment is not good, a relay node (RN) is provided between the base station and the user equipment to provide a radio channel having a more excellent channel status to the user equipment. Also, the RN is introduced from the base station at a cell edge area having a poor channel status, whereby a data channel of higher speed can be provided and cell service coverage can be extended. As described above, the RN has been introduced to resolve a propagation shade zone in the wireless communication system and is currently used within the wide range. At this time, the base station, which manages the RN, will be referred to as a donor base station (donor eNB or DeNB). Also, an interface between the RN and the DeNB, which is newly generated by the RN, will be defined as Un interface, and is used differently from Uu interface between the user equipment and the network node (RN or eNB).

Figure 8:
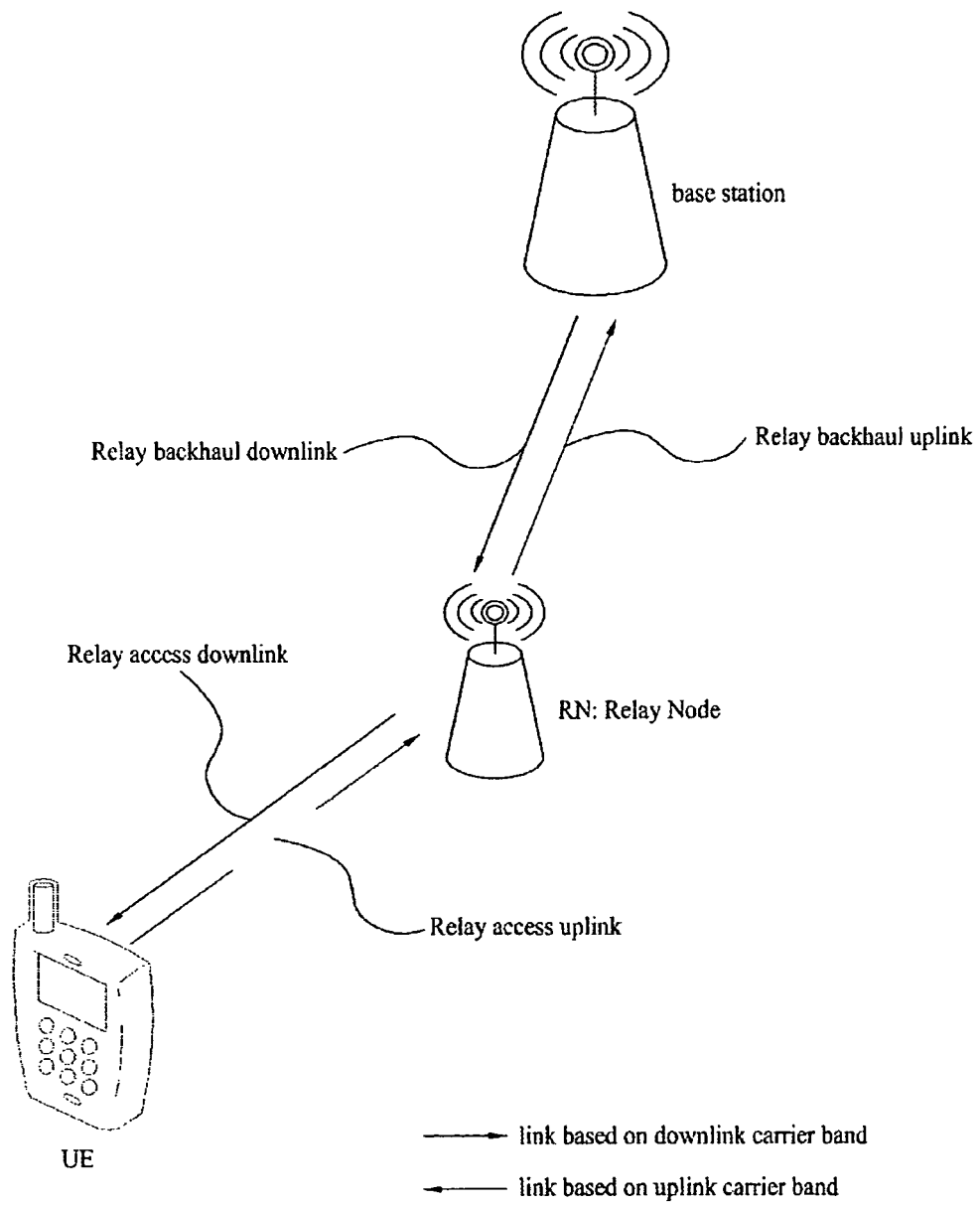
FIG. 8 is a conceptional diagram illustrating a network that includes a relay node (RN), a base station (DeNB), and a user equipment (UE)

FIG. 8 is a conceptional diagram illustrating a network that includes a relay node (RN), a base station (DeNB), and a user equipment (UE).

Referring to FIG. 8, the RN serves to manage the user equipment (UE) on behalf of the DeNB. In other words, the user equipment regards the RN as the DeNB. Accordingly, the Uu interface between the UE and the RN uses Uu interface protocol, i.e., MAC/RLC/PDCP/RRC used in the conventional LTE system, as it is.

The DeNB may regard the RN as the UE or the eNB as the case may be. In other words, when the RN initially accesses the DeNB, since the DeNB does not know the presence of the RN, the RN accesses the DeNB through the random access procedure like the UE. After the RN accesses the DeNB once, it serves as the eNB that manages the user equipment connected with the RN. Accordingly, the Un interface protocol should be defined to add a function of a network protocol together with the function of the Uu interface protocol. In the current 3GPP standard, the Un interface protocol has been discussed about functions to be added to or changed from each protocol layer based on the Uu interface protocol such as MAC/RLC/PDCP/RRC.

Meanwhile, the RN can be divided into inband and outband depending on radio resources used in the Un interface and the Uu interface. In the inband RN, the Un interface and the Uu interface use the same frequency. In this case, it is required to allocate subframes used by each of the Un interface and the Uu interface such that transmission and reception of the Un interface may not interfere with those of the Uu interface. The outband RN means that the Un interface and the Uu interface use their respective frequencies different from each other. In this case, since each interface uses its respective frequency different from that of the other interface, it is not required to consider interference that affects different interfaces.

Since only the Uu interface exists as a radio interval in the LTE system where the RN does not exist, the user equipment can identify the channel status. Accordingly, the base station has not been required to notify the user equipment of the channel status.

However, as the Uu interface and the Un interface exist as radio intervals due to the RN in the LTE-A system, the user equipment connected with the RN cannot identify the status of the Un interface, which is the radio interval between the RN and the DeNB. The user equipment attempts uplink or downlink transmission and reception to and from the RN in a state that the user equipment does not identify the status of the Un interface. For this reason, the following problems may occur in the inband RN.

If the Un interface cannot be used due to deterioration of the radio channel, such as radio link failure (RLF), the RN attempts new RRC connection with the DeNB. The user equipment of RRC connected state within the cell of the RN may attempt data transmission and reception without knowing radio link failure of the Un interface. At this time, the RN may fail to successfully receive uplink transmission of the user equipment due to uplink transmission of the RN for recovery of the Un interface. Also, uplink transmission of the user equipment may act as interference for reception of RRC signal transmitted from the DeNB to the RN.

The user equipment of the RRC idle state may attempt uplink transmission for RRC connection without knowing radio link failure of the Un interface. The uplink transmission of the user equipment of the RRC idle state acts as interference for reception of RRC signal from the DeNB to the RN during Un interface recovery of the RN in the same manner as the user equipment of RRC connected state. Also, the RN may fail to successfully receive uplink transmission of the user equipment due to uplink transmission from the RN to the DeNB.

Accordingly, the present invention suggests that the user equipment receives a message from the RN and determines uplink transmission depending on whether an indicator for controlling the operation of the user equipment based on the Un interface status between the RN and the DeNB is included in the message.

In more detail, if radio link failure (RLF) occurs in the Un interface, the RN transmits a message, which indicates that the Uu interface can be used, to user equipments located within its cell, before attempting a random access procedure for recovery of RRC connection. To this end, the RN transmits the message, which includes a suspension indicator indicating suspension of the operation of the user equipment related to uplink transmission. Also, if the Un interface is recovered, i.e., if new RRC connection procedure is completed, the RN transmits a message, which indicates that the Uu interface can be used, to user equipments located within its cell. To this end, the RN transmits the message, which includes a resumption indicator indicating resumption of the operation of the user equipment related to uplink transmission. The RN can transmit the suspension indicator and the resumption indicator by using a field of 1 bit size.

Meanwhile, if the RN fails to recover radio link failure (RLF), it can command the user equipment located within its cell to move to another cell. To this end, the RN transmits the message, which includes a release indicator. Here, the release indicator includes information on failure of recovery of the Un interface, which is RRC connection release cause, and information for moving to another cell. Alternatively, the RN may achieve the same purpose by using a timer in addition to the explicit means such as the release indicator. In other words, the RN may transmit the suspension indicator together with a timer value. If the timer expires, the user equipment attempts movement to another cell, i.e., new RRC connection procedure regardless of reception of the release indicator.

Hereinafter, the detailed operation of the user equipment, which has received the aforementioned indicators or timer, depending on whether the user equipment is in the RRC connected state or RRC idle state will be described.

First of all, the RRC connected state of the user equipment will be described. The user equipment, which has received the suspension indicator, suspends uplink data transmission in progress or intended for progress, by using the uplink radio resource, which has been already allocated, and at the same time suspends the procedure of requesting an uplink radio resource. For example, the user equipment suspends progress of timers of MAC layer, such as periodicBSR-Timer and retxBSR-Timer, timers of RLC layer, such as t-PollRetransmit, t-Reordering, and t-StatusProhibit, and timers of PDCP layer such as discardTimer.

Subsequently, the user equipment waits for reception of another indicator, i.e., resumption indicator or release indicator, from the RN, or sets its parameter release timer to the received value by using the timer value received together with the suspension indicator and operates the timer. The user equipment that has received the resumption indicator resumes the procedure of requesting an uplink radio resource, and if the release timer is being operated, the user equipment suspends and resets the timer. Also, if the user equipment receives the release indicator or if the release timer expires, the user equipment releases all of the radio bearers (RBs), and performs the cell reselection procedure for moving to another cell after shifting to the RRC idle state.

Next, the RRC idle state of the user equipment will be described. If the user equipment of the RRC idle state receives the suspension indicator, it suspends attempt of RRC connection and waits for, reception of another indicator, i.e., resumption indicator or release indicator or sets the parameter release timer (T_RA_IND) to the received value by using the timer value received together with the suspension indicator and operates the timer. In this case, the user equipment can perform the cell reselection procedure for moving to another cell. The user equipment that has received the resumption indicator resumes the RRC connection procedure, and if the release timer is being operated, the user equipment suspends and resets the timer. Also, if the user equipment receives the release timer or if the release timer expires, the user equipment performs the cell reselection procedure for moving to another cell.

As a method of receiving the aforementioned indicators from the RN, a method of receiving the indicators through a system information message (e.g. SIB1) or paging message may be considered. The user equipment that has identified that the user equipment identity is included in the system information message or paging message performs the corresponding operation in accordance with the indicator included in the message.

The user equipment may receive the indicator through MAC control element (MAC CE), or may receive the indicator in the MAC PDU through reserved bits. In particular, reserved bits of 2 bits size exist per MAC subheader in the current MAC PDU structure. Accordingly, the reserved bits of 2 bits size can be used to signal the indicator.

Also, a method of configuring new RRC message for the indicator can be used, and the user equipment can receive the indicator through the physical channel, PDCCH. Especially, the indicator is mapped to the transport channel, DL-SCH through the logical channel, CCCH, and the physical channel, PDCCH transfers the DL-SCH. Preferably, for informing that the indicator is transmitted, the PDCCH can include C-RNTI. Further, the indicator can be retransmitted by HARQ process of MAC layer. That is, the user equipment receiving the indicator included in the PDCCH does not transmit feedback signal to the RN, and then the RN can retransmit the indicator to the user equipment without the feedback signal. The number of re-transmissions of the indicator can be fixed.

Further, the indicators (e.g. the suspension indicator, the resumption indicator and the release indicator) can be configured for a group of the user equipment or all of the user equipment in the cell belongs to the RN, not for specific user equipment.

For example, the paging message can includes user equipment group identity. The user equipments included in the group or all of the user equipment in the cell belongs to the RN which detect the user equipment group identity in the paging message perform the corresponding operation in accordance with the indicators included in the paging message.

Further, the RN can transmit the indicators via the PDCCH including Group C-RNTI (G-RNTI). Therefore, the RN assigns a Group C-RNTI to the user equipments included in the group or all of the user equipment in the cell belongs to the RN. The user equipments detect the indicators by receiving CCCH mapped into DL-SCH transmitted through PDCCH, and then perform the corresponding operation in accordance with the indicators.

Figure 9:
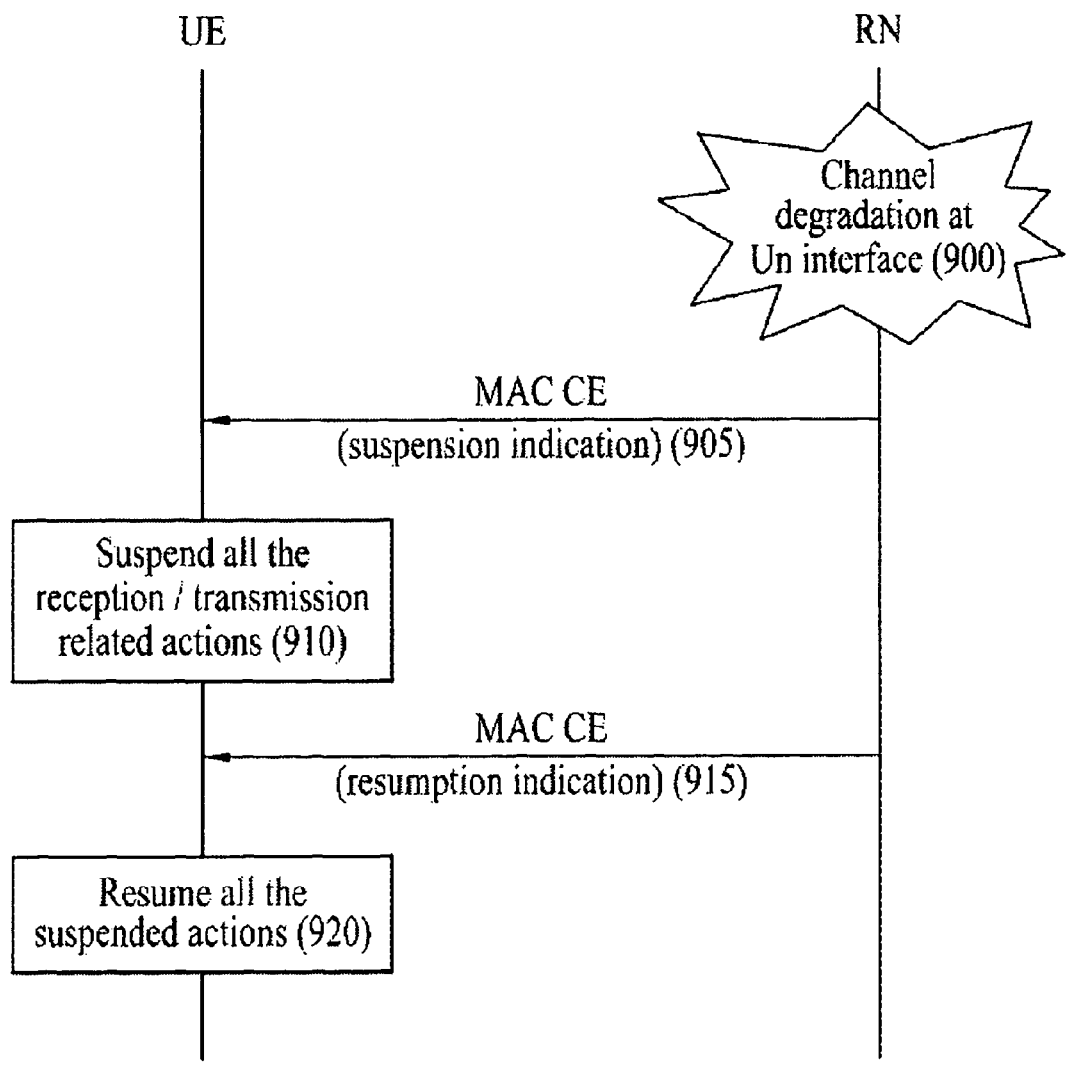
FIG. 9 is a diagram illustrating a method of controlling uplink transmission of a user equipment in a relay node (RN) in accordance with the embodiment of the present invention.

Alternatively, instead of a Group C-RNTI, SI-RNTI can be used to indicate transmission of the indicators. In this case, the indicators are transmitted on subframe where the system information message is transmitted. FIG. 9 is a diagram illustrating a method of controlling uplink transmission of a user equipment in a relay node (RN) in accordance with the embodiment of the present invention. In particular, FIG. 9 illustrates a method of signaling a suspension indicator and a resumption indicator from a relay node (RN) to a user equipment through MAC CE.

First of all, radio channel failure (RLF) occurs in the Un interface between the DeNB and the RN in step 900. In step 905, the RN transfers the suspension indicator, which indicates suspension of uplink transmission attempt, to the user equipment of the RRC connected state through the MAC CE during recovery of the Un interface. For example, the RN may signal the suspension indicator by setting reserved bits of 2 bits size included in the first subheader of the MAC PDU to 01.

Subsequently, the user equipment that has received the MAC CE, which includes the suspension indicator, suspends uplink data transmission from the Uu interface and the procedure of requesting a radio resource in step 910.

Meanwhile, after recovery of the Un interface, the RN can transmit the resumption indicator, which indicates resumption of uplink data transmission and reception, to the user equipment through the MAC CE in step 915. For example, the RN may signal the resumption indicator by setting reserved bits of 2 bits size included in the first subheader of the MAC PDU to 10. The user equipment that has received the MAC CE, which includes the resumption indicator, requests the RN of the uplink radio resource in step 920 if there are data to be transmitted, and attempts uplink data transmission.

If recovery of the Un interface is failed, the RN can transmit the release indicator, which indicates resumption of uplink data transmission and reception, to the user equipment through the MAC CE. For example, the RN may signal the release indicator by setting reserved bits of 2 bits size included in the first subheader of the MAC PDU to 11.

Figure 10:
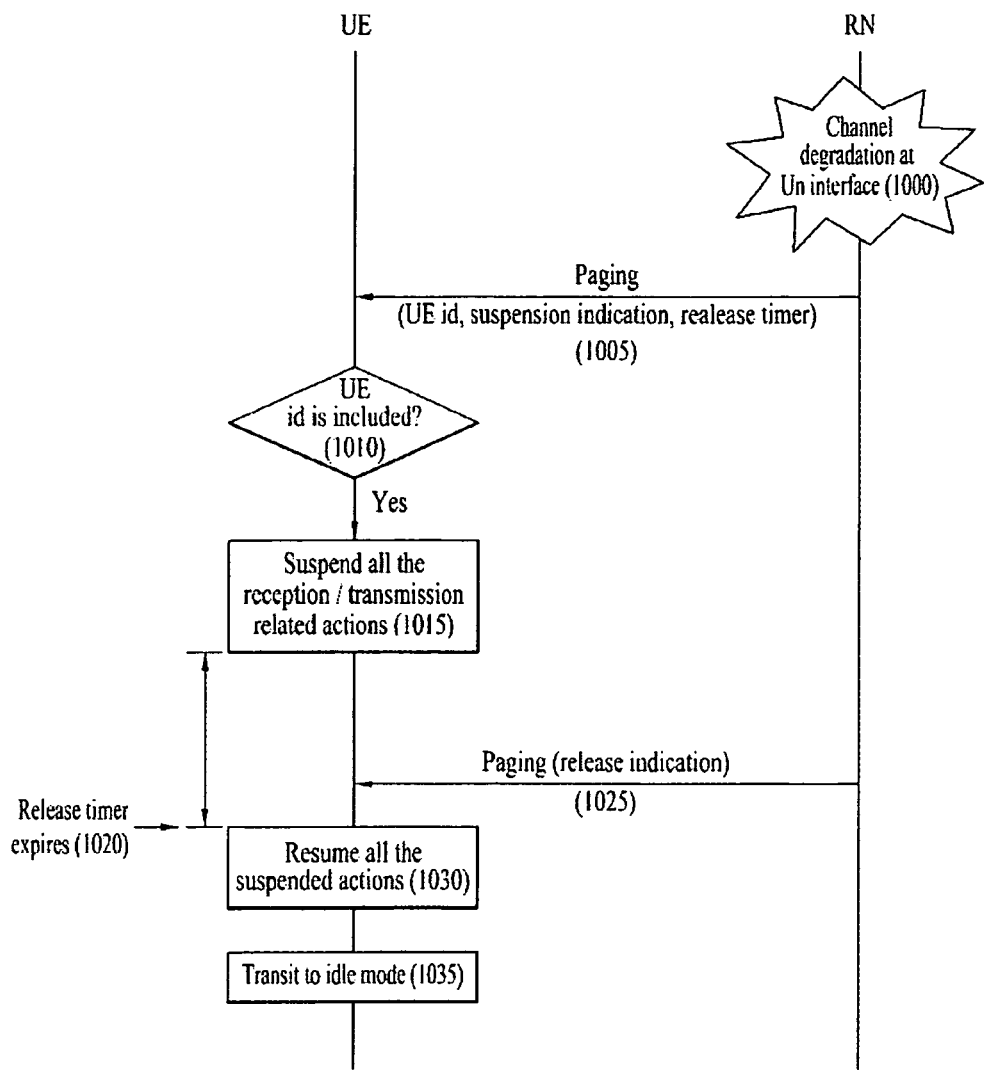
FIG. 10 is a diagram illustrating another method of controlling uplink transmission of a user equipment in a relay node (RN) in accordance with the embodiment of the present invention.

FIG. 10 is a diagram illustrating another method of controlling uplink transmission of a user equipment in a relay node (RN) in accordance with the embodiment of the present invention. In particular, FIG. 10 illustrates a method of signaling a suspension indicator, which includes a timer value, from a relay node (RN) to a user equipment through a paging message.

First of all, radio channel failure (RLF) occurs in the Un interface between the DeNB and the RN in step 1000. In step 1005, the RN transfers the suspension indicator, which indicates suspension of uplink transmission attempt, to the user equipment through the paging message during recovery of the Un interface. In this case, it is preferable that the paging message includes the timer value together with the suspension indicator.

The user equipment that has received the paging message, which includes the suspension indicator, identifies whether the paging message includes the user equipment identity or the user equipment group identity in step 1110. Subsequently, the user equipment that has identified whether the paging message includes the user equipment identity or the user equipment group identity suspends uplink data transmission from the Uu interface and the procedure of requesting a radio resource in step 1115 after identifying the suspension indicator from the paging message. In this case, the user equipment sets and operates the release timer by using the timer value included in the paging message.

Subsequently, if the release timer expires in step 1020 or if the user equipment receives the release indicator in step 1025, the user equipment releases all of the radio bearers (RBs) in steps 1030 and 1035, and shifts to the RRC idle state. Afterwards, the user equipment performs the cell reselection procedure for moving to another cell.

According to the present invention, the RN can suspend unnecessary uplink transmission attempt of the user equipment by notifying the user equipment, which is located within the cell of the RN, of the status of the Un interface. Moreover, interference, which may be caused by uplink transmission attempt of the user equipment in recovery of the Un interface, can be prevented from occurring in advance.

Figure 11:
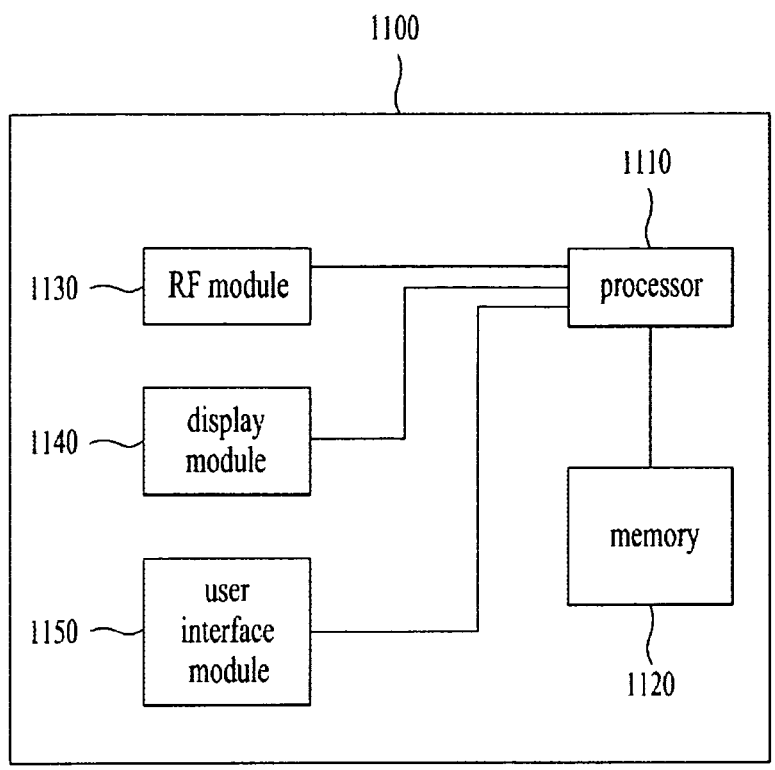
FIG. 11 is a block diagram illustrating a communication apparatus according to the embodiment of the present invention.

FIG. 11 is a block diagram illustrating a communication apparatus according to the embodiment of the present invention.

Referring to FIG. 11, the communication apparatus 1100 includes a processor 1110, a memory 1120, a radio frequency (RF) module 1130, a display module 1140, and a user interface module 1150.

The communication apparatus is illustrated for convenience of description, and some of its modules may be omitted. Also, the communication apparatus may further include necessary modules. Moreover, some modules may be divided into segmented modules. The processor 1110 is configured to perform the operation according to the embodiment of the present invention illustrated with reference to the drawings. For the detailed operation of the processor 1110, refer to the description illustrated in FIG. 1 to FIG. 10.

The memory 1120 is connected with the processor 1110 and stores an operating system, an application, a program code, and data therein. The RF module 1130 is connected with the processor 1110 and converts a baseband signal to a radio signal or vice versa. To this end, the RF module 1130 performs analog conversion, amplification, filtering and frequency uplink conversion, or their reverse processes. The display module 1140 is connected with the processor 1110 and displays various kinds of information. Examples of the display module 1140 include, but not limited to, a liquid crystal display (LCD), a light emitting diode (LED), and an organic light emitting diode (OLED). The user interface module 1150 is connected with the processor 1110, and can be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the relay node and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point.

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method of transceiving a signal in a wireless communication system and the apparatus thereof have been described based on the 3GPP LTE system, the method and the apparatus can be applied to various wireless communication systems in addition to the 3GPP LTE system.

The invention claimed is:

1. A system comprising: A method of processing a signal at a user equipment of a wireless communication system, the method comprising:
   receiving a first message from a network node; starting a timer in response to receiving the first message; receiving one of a second message or a third message from the network node; and
   performing cell reselection if releasing after the timer expires before receiving the one of the second message or the third message,
   wherein if the user equipment is in a radio resource control (RRC) connected state, receiving the one of the second message or the third message from the network node comprises:
   when receiving the second message, resuming communication with the network node; and
   when receiving the third message, releasing a connection with the network node, and wherein if the user equipment is a user equipment of radio resource control (RRC) idle state, receiving the one of the second message or the third message from the network node comprises:
   when receiving the second message, resuming a connection with the network node; and when receiving the third message, performing cell reselection.

2. The method of claim 1, wherein the first message includes information on the timer.

3. The method of claim 2, wherein the information on the timer is a timer value.

4. The method of claim 1, further comprising suspending communication with the network node after receiving the first message.

5. The method of claim 1, wherein the network node is a relay node.

* * * * *